Dec. 31, 1929.  J. F. O'CONNOR  1,742,005
HAND BRAKE
Filed Oct. 19, 1927
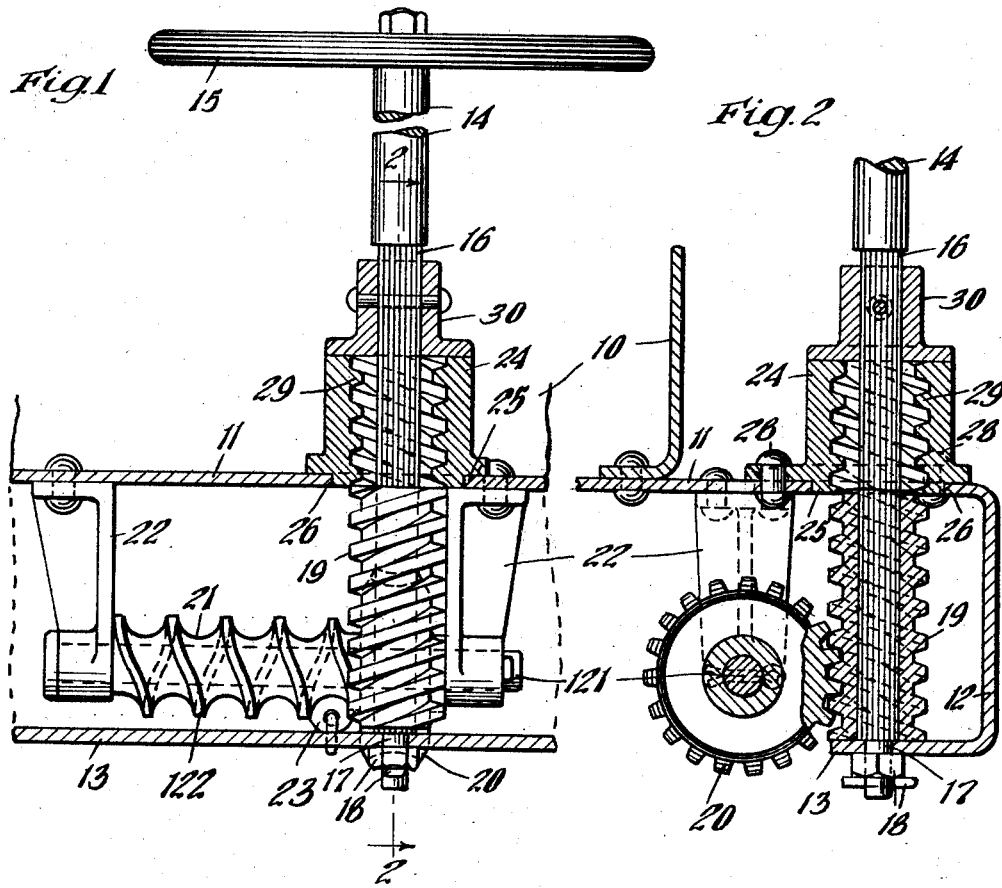
Witness
Wm. Geiger
Inventor
John F. O'Connor
By George I. Haight
His Atty.

Patented Dec. 31, 1929

1,742,005

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

HAND BRAKE

Application filed October 19, 1927. Serial No. 227,176.

The invention relates to improvements in hand brakes.

An object of the invention is to provide a hand brake wherein inter-engaging worm elements are employed for tightening the brake rigging, together with novel means for disconnecting the worm elements to effect release of the brake.

Other and further objects of the invention will more clearly appear from the description and claims hereinafter following.

In the drawings forming part of this specification, Figure 1 is a vertical sectional view of the invention, partly in elevation, showing the invention applied to the end structure of a railway car, when viewed from the outer end of the car. And Figure 2 is a vertical sectional view corresponding substantially to the line 2—2 of Figure 1.

As shown in the drawings, 10 represents the end wall of a car, and 11 an end platform having a vertical web 12 and a horizontal inwardly turned flange 13 integrally formed with the lower end of the web. Mounted upon the platform 11 is the brake mechanism which includes a rotatable staff 14 having a hand wheel 15 on its upper end by means of which the staff may be rotated, the upper end of said staff being suitably secured to the wall 10 by a suitable bracket, not shown in the usual manner. The staff 14 is provided with a portion 16 square in cross section, which extends through the platform 11 and is provided at its lower end with a reduced portion 17 which is rotatably mounted in a suitable bearing aperture in the flange 13 of the platform, a nut and pin arrangement indicated at 18, being provided for maintaining the staff in position for rotation about its longitudinal axis, and preventing longitudinal movement thereof. Slidably but non-rotatably mounted upon the squared portion 16 of the staff is a worm 19 having a right-hand thread, said worm being normally disposed so as to mesh with the teeth of a worm wheel 20. The worm wheel 20 is carried at one end of the winding drum 21, mounted on the shaft 121, said shaft being journaled in suitable brackets indicated at 22—22 which are secured to the under surface of the platform 11. The drum 21 is provided with a helical rib 122 defining a guide for the brake chain which extends to the brake rod, said brake chain being secured to a suitable eye-bolt 23 fixed to the drum.

Mounted upon the platform 11 is a nut member 24, said nut member including an annular flange portion 25 which is disposed in a suitable opening 26 in the platform 11. Said nut member is also provided with a flange 27 adjacent its lower end by means of which the nut member is secured in fixed position on the platform 11 by suitable rivets indicated at 28. The nut member 24 is provided with an interior right-hand thread 29, adapted for the reception of the thread of the worm 19 when the latter is rotated in a counter-clockwise direction, but preventing the entrance of the worm 19 when rotated in a clockwise direction. A collar 30 is secured to the upper end of the squared portion of the staff and bears upon the upper edge of the nut 24.

In operation, when it is desired to set the brakes, the hand wheel 15 is rotated in a clockwise direction, effecting clockwise rotation of the worm 19, forcing it downward on the staff 14 until clearing the nut, after which movement is transmitted to the drum 21 through the worm wheel 20, so as to wind the brake chain on the drum 21, it being noted that the helical formation of the drum serves to guide the chain so that the same is uniformly disposed on the drum. During the clockwise rotation of the staff 14 and worm 19, the worm bears against the under-surface of the nut 24, and held there by tension of the chain being prevented from entering the nut due to the direction of rotation. The worm elements have the effect in the usual way of preventing reverse rotation of the drum 21, doing away with the necessity for providing a pawl and ratchet mechanism. After the brake is set, it may be eased off to a limited degree by counterclockwise rotation of the brake staff, which causes the thread on the worm to take hold of the thread in the nut and partially move upwardly into the nut. When it is desired to quickly and completely release the brake, the counterclockwise rotation of the staff is continued, causing further longitudinal upward reciprocation of the worm 19 until the same is completely disengaged from the worm wheel 20, and the worm wheel 20 thus released, permits rapid unwinding of the brake chain from the drum 21 under the pull exerted on the chain by the brake mechanism proper and without the usual drag due to the friction of the engaging parts. The release of the worm elements is effected through a few turns of the brake staff 14 in a counter-clockwise direction as will be readily appreciated, doing away with the necessity in ordinary constructions of rotating the staff in a counter-clockwise direction the same number of turns as in winding up the brake chain. When it is again desired to set the brake, a few turns of the staff in a clockwise direction will cause the worm 19 to move downwardly out of the nut 24 into re-engagement with the worm wheel 20, after which the drum will be rotated to take up the brake chain.

While I have herein shown and described what I consider the preferred manner of carrying out the invention, the same is merely illustrative and I contemplate all changes and modifications which come within the scope of the claims appended hereto.

I claim:

1. In a hand brake mechanism, the combination with a rotatable brake staff; of a worm element slidably mounted on said staff; a winding drum having a worm wheel normally disposed in engagement with said worm element; and a threaded nut adapted to co-operate with said worm upon rotation of said staff under certain conditions to effect sliding movement of said worm element into and out of engagement with the worm wheel on said drum.

2. In a hand brake mechanism, the combination with a rotatable brake staff having a squared portion; a worm element non-rotatably and reciprocably mounted on the squared portion of said staff; a winding drum having a worm wheel normally engageable with said worm element; and a fixed nut having an internal thread adapted to prevent entrance of said worm element when rotated in a direction to set the brake, and effect withdrawal of said worm element with respect to said worm wheel when the staff is rotated to release the brakes.

3. In a hand brake mechanism, the combination with a rotatable member; of a winding drum; cooperating worm elements rotatable with said member and drum, respectively, to effect winding movement of the latter when said member is rotated in one direction; and means for holding said worm elements engaged during said winding movement and automatically effecting disengagement of said worm elements to effect quick release of the brake through rotation in a reverse direction of said rotatable member.

4. In a hand brake mechanism, the combination with a brake staff and a winding drum; of worm elements rotatable with the staff and said drum, respectively; and means having shouldered engagement with one of said worm elements to maintain engagement of said elements to effect rotation of said drum when the staff is rotated in one direction, said means having threads cooperating with one of said elements engageable therewith through rotation of said staff in the reverse direction to withdraw the worm element from operative engagement with the cooperating worm element to effect rapid release of the brake.

5. In a hand brake mechanism, the combination with a rotatable staff and a winding drum; of a worm slidably mounted on said staff and rotatable therewith; a worm wheel fixed to the drum and engaged by said worm to effect rotation of the drum when the staff is rotated in one direction to tighten the brakes; and a nut having a thread adapted to cooperate with the worm, said nut normally having shouldered engagement with the worm to maintain the same in operative engagement with said worm wheel, the worm being brought into threaded engagement with the nut upon rotation of the staff in a reverse direction to move the worm lenghwise of the staff and disengage the same from the worm wheel to permit free rotation of the worm wheel and drum to effect rapid release of the brakes.

In witness that I claim the foregoing I have hereunto subscribed my name this 15th day of October, 1927.

JOHN F. O'CONNOR.